(12) United States Patent
Annavajjhala et al.

(10) Patent No.: US 9,819,219 B2
(45) Date of Patent: Nov. 14, 2017

(54) INTELLIGENT AND EFFICIENT OFF-GRID SOLAR HOME ENERGY SYSTEM AND METHOD THEREOF

(71) Applicants: Ravi Annavajjhala, San Jose, CA (US); Srinivasan Sivaram, Monte Sereno, CA (US)

(72) Inventors: Ravi Annavajjhala, San Jose, CA (US); Srinivasan Sivaram, Monte Sereno, CA (US)

(73) Assignees: Ravi AnnavajjhalaCA (US); Srinivasan SivaramCA (US)

( * ) Notice: Subject to any disclaimer, the term of this patent is extended or adjusted under 35 U.S.C. 154(b) by 459 days.

(21) Appl. No.: 14/517,876

(22) Filed: Oct. 19, 2014

(65) Prior Publication Data

US 2015/0108839 A1 Apr. 23, 2015

(51) Int. Cl.
*H02J 4/00* (2006.01)
*H02J 7/35* (2006.01)
*H02J 7/00* (2006.01)

(52) U.S. Cl.
CPC .............. *H02J 7/35* (2013.01); *H02J 7/0024* (2013.01); *H02J 7/0026* (2013.01); *Y10T 29/49117* (2015.01); *Y10T 307/383* (2015.04)

(58) Field of Classification Search
CPC ........... Y10T 307/406; Y10T 29/49117; Y10T 307/383; H02J 3/14; H02J 7/0024; H02J 7/0026; H02J 7/35
See application file for complete search history.

(56) References Cited

U.S. PATENT DOCUMENTS

| | | | |
|---|---|---|---|
| 2010/0274408 A1* | 10/2010 | Stiles, Jr. ............... | G06Q 10/06 700/296 |
| 2012/0143383 A1* | 6/2012 | Cooperrider ............. | H04Q 9/00 700/295 |
| 2013/0162037 A1* | 6/2013 | Kim ...................... | H02J 7/0068 307/24 |
| 2013/0175862 A1* | 7/2013 | Kelly ........................ | H02J 1/14 307/24 |
| 2013/0300194 A1* | 11/2013 | Palmer ...................... | H02J 3/32 307/23 |
| 2015/0066228 A1* | 3/2015 | Clifton .................. | H02J 7/0068 700/295 |

* cited by examiner

*Primary Examiner* — Jared Fureman
*Assistant Examiner* — Aqeel Bukhari
(74) *Attorney, Agent, or Firm* — Barry Choobin; Patent 360 LLC

(57) ABSTRACT

The various embodiments herein provide an energy efficient DC off-grid home system and a method for operating the same. The system generates, stores and delivers the solar energy to the connected equipments in a controlled and efficient manner. The system has several solar panels, a battery bank, a home control unit, several appliances and equipments which run on electric power and a remote terminal unit. The solar panels are used to capture maximum solar energy from the sun. The battery bank has several batteries arranged in series and parallel combinations to store maximum electrical energy. The home control unit is a central control station which assists in storing energy in the battery bank, delivering optimum energy to the electrical appliances and monitoring the healthy operating status of the entire system.

18 Claims, 2 Drawing Sheets

INTELLIGENT AND EFFICIENT OFF-GRID SOLAR HOME ENERGY SYSTEM AND METHOD THEREOF

CROSS REFERENCE TO RELATED APPLICATIONS

This patent application claims the priority of the Indian Provisional Patent Application No. 3291/CHE/2013 filed on Jul. 23, 2013, and postdated to Oct. 23, 2013 with the title "An Intelligent and Efficient Off-Grid Solar Home Energy System", and the content of which is incorporated in entirety by reference herein.

BACKGROUND

Technical Field

The embodiments herein are generally related to solar home energy systems and particularly related to an off-grid DC solar energy generation and storage system. The embodiments herein are more particularly related to an intelligent and efficient off-grid DC solar energy system and a method for delivering and monitoring solar energy to the household appliances.

Description of the Related Art

The currently available grid-connected and off-grid solar home systems comprise a solar panel and an inverter that converts an energy generated by the Solar Panel from Direct Current (DC) to a grid compatible Alternating Current (AC). In the case of an off-grid system, a battery bank is charged by the panels to supply a power during the switching off period of the grid power. In either case, the panel output voltage ranges anywhere from 12 v to 60 v DC depending on the configuration of the panels and the inverter that converts the output of these panels to AC voltage of 110 v or 220 v at a frequency of 50 Hz or 60 Hz.

While AC systems are widely used all over the world, the end user equipment operating on an AC supply typically tends to be inefficient with respect to an energy usage. For example, an incandescent bulb with a power rating of 100 W generates roughly the same lumens as Light Emitting Diode (LED) with a power rating of 10 W. Further, the Light Emitting Diodes (LEDs) requires DC input voltage. When the LEDs are operated on an AC grid, a down conversion of the AC voltage to a DC voltage has to take place and which results in a loss of energy. Similarly there are fans, televisions and other equipments that are operated on DC and these equipments operated on DC are far more efficient than that of their AC counter parts.

Hence, there is a need for an intelligent and energy efficient DC off-grid solar system and a method for generating, storing and monitoring distribution or delivery of solar energy to the end user equipments to extend life of battery and an operating period of an end user equipment daily. Also, there is need for a system and method for delivering DC energy to the household systems efficiently and without any conversion to AC.

The above mentioned shortcomings, disadvantages and problems are addressed herein and which will be understood by reading and studying the following specification.

OBJECTIVES OF THE EMBODIMENTS

The primary object of the embodiments herein is to provide an intelligent, and energy efficient off-grid DC solar system and method for generating, storing and distributing the solar energy to the household equipments efficiently and to extend the battery life and the operating period of the household equipments.

Another object of the embodiments herein is to provide a system and a method for delivering the solar energy to the household equipments in DC mode efficiently without being converted to AC.

Yet another object of the embodiments herein is to provide an intelligent, and energy efficient off-grid DC solar system and method to monitor a healthy operating condition of the system on a periodic basis.

Yet another object of the embodiments herein is to provide a system and method for analyzing the system data periodically to determine a suitable time for performing a maintenance service such as recharging the batteries with distilled water, cleaning the panels and servicing the equipment.

These and other objects and advantages of the embodiments herein will become readily apparent from the following detailed description taken in conjunction with the accompanying drawings.

SUMMARY

The various embodiments of the embodiments herein provide an energy efficient DC off-grid home system and a method for operating the same. The DC off-grid home system is configured for generating, storing and delivering the solar energy to the connected equipments in a controlled and efficient manner. The DC off-grid home system comprises a plurality of solar panels; a battery bank; a home control unit; and a remote terminal unit. The plurality of solar panels is configured to capture solar energy and convert the solar energy to electrical energy. The battery bank comprises a plurality of batteries, which is configured to store the electrical energy received from the solar panels. The home control system is configured to assist the battery bank, in storing the electrical energy. The home control system is further configured to deliver optimum energy to a plurality of electrical appliances, and to monitor a system condition or status. The remote control unit, in communication with the home control unit is configured to monitoring a healthy operating status of a system on a periodic basis, and to upload monitored data to a cloud hosted remote server.

According to one embodiment herein, the plurality of solar panels comprises a set of solar photovoltaic modules electrically connected and mounted on a supporting structure. The photovoltaic module comprises a plurality of solar cells.

According to one embodiment herein, the home control unit comprises a plurality of sub-systems for controlling and monitoring a to plurality of processes. The plurality processes ranges from a process for generating electrical energy to a process for delivering the electrical energy to the plurality of electrical appliances.

According to one embodiment herein, the plurality of sub-systems further comprises an intelligent charge controller configured to control a delivery of maximum energy from the plurality of the solar panels to the battery bank, a communication module in communication with a cloud hosted remote server and configured to upload information regarding a healthy operating status of the system to a load control unit, a DC to DC converter configured to control an output voltage of the battery bank based a voltage requirement of the plurality of appliances and an energy governor module.

According to one embodiment herein, the home control unit delivers the electrical power to the end user equipment and constantly monitors the electrical power drawn by the plurality of appliances to change an output voltage on the channel to maximize an efficiency of the off-grid system.

According to one embodiment herein, the energy governor constantly monitors the battery capacity and a consumption pattern to dynamically adjust the energy delivered to the plurality of appliances loads using an intelligent algorithm to maximize the battery life and to increase an operating time of the plurality of appliances.

According to one embodiment herein, the off-grid system directly distributes the electrical energy stored in the battery bank to the plurality of appliances. The plurality of appliances comprises one or more domestic electrical and electronic appliances.

According to one embodiment herein, the system comprises a variable output DC to DC converter. The off-grid system integrates the variable output DC to DC converter with the charge controller unit.

According to one embodiment herein, the output voltage of the DC to DC converter is tuned dynamically corresponding to every sub-unit of a main appliance by an on-board microcontroller to minimize the power consumption.

According to one embodiment herein, the remote terminal unit comprises a communication module for uploading the monitored data to the cloud hosted remote server.

According to one embodiment herein, the communication module adopts wired and wireless communication mechanisms selected from the group comprising Ethernet, Wi-Fi, GSM/GPRS, LTE, WiMax, 3G, power line communication and ZigBee protocols.

According to one embodiment herein, the home control unit delivers the electrical power to the plurality of appliances and constantly monitors the electrical power drawn by the plurality of appliances to change the output voltage on the channel to maximize the efficiency of the DC off-grid home system.

According to one embodiment herein, an on-board microcontroller is configured for tuning the output voltage of the DC to DC converter for minimizing the power consumption. The output voltage of the DC to DC converter is tuned dynamically corresponding to each electrical appliance.

According to one embodiment herein, the off grid system further comprises a primary sensor module installed at strategic locations within the end user premises to gather the power consumption data from the solar panels. The system further comprises a secondary sensor module configured to monitor a plurality of parameters including, but not limited to temperature, light and humidity of the system. The primary sensor module and the secondary sensor module collect the plurality of data for selecting a suitable time for maintenance services. The maintenance services comprise recharging the batteries with distilled water, cleaning the solar panels, and servicing an electrical appliance.

According to one embodiment herein, the system further comprises an electrical charge monitor sensor installed at the battery bank for monitoring the electrical charge level in the plurality of batteries.

According to one embodiment herein, the data from the primary sensor module, the secondary sensor module and the charge monitor sensor are fed to the on-board microcontroller.

According to one embodiment herein, the on-board microcontroller comprises one or more programs for regulating the plurality of sub-systems and modules of the system based on the data received from the primary sensor module, the secondary sensor module and the charge monitor sensor. The on-board microcontroller regulates the energy governor to control a delivery of energy to the plurality of appliances based on the data received from the charge monitor sensor.

According to one embodiment herein, the home control unit further comprises a display for displaying the status of the DC off-grid home system and real time performance data to the end user. The home control unit further comprises a keypad for providing inputs and controlling the display. The display is selected from a group comprising an Organic Light Emitting Diode (OLED) and a Liquid Crystal Display (LCD). The display is configured to alert the end user on the critical events. The critical events include a low battery condition, a solar panel cleaning requirement condition and a maintenance requirement condition.

According to one embodiment herein, the status of the DC off-grid home system comprises information on a currently switched-on appliance, an amount of energy drawn from the appliance, temperature, humidity, battery capacity, a rate of discharge, and an overall energy delivered from the solar panel over time.

The embodiments herein provide a method for generating, storing and delivering solar energy to the plurality of appliances through an off-grid DC solar home system. The method comprises the following steps: A plurality of solar panels is installed for capturing solar energy and converting solar energy to electrical energy. A battery bank is installed for storing electrical energy. A home control system is installed for assisting in storing the electrical energy in the battery bank, delivering an optimum energy to a plurality of electrical appliances, and monitoring an operating status of the system. The home control unit is connected to the plurality of appliances which run on the generated electric power. A healthy operating status of the system is monitored on a periodic basis. The monitored data is uploaded to a cloud hosted remote server. An output voltage of the battery bank is controlled based on the voltage requirements of the plurality of appliances. The delivery of maximum energy is controlled from the plurality of the solar panels to the battery bank. The energy delivered to the plurality of appliances is adjusted using an intelligent algorithm to maximize the battery life and to increase the operating time of the plurality of appliances.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
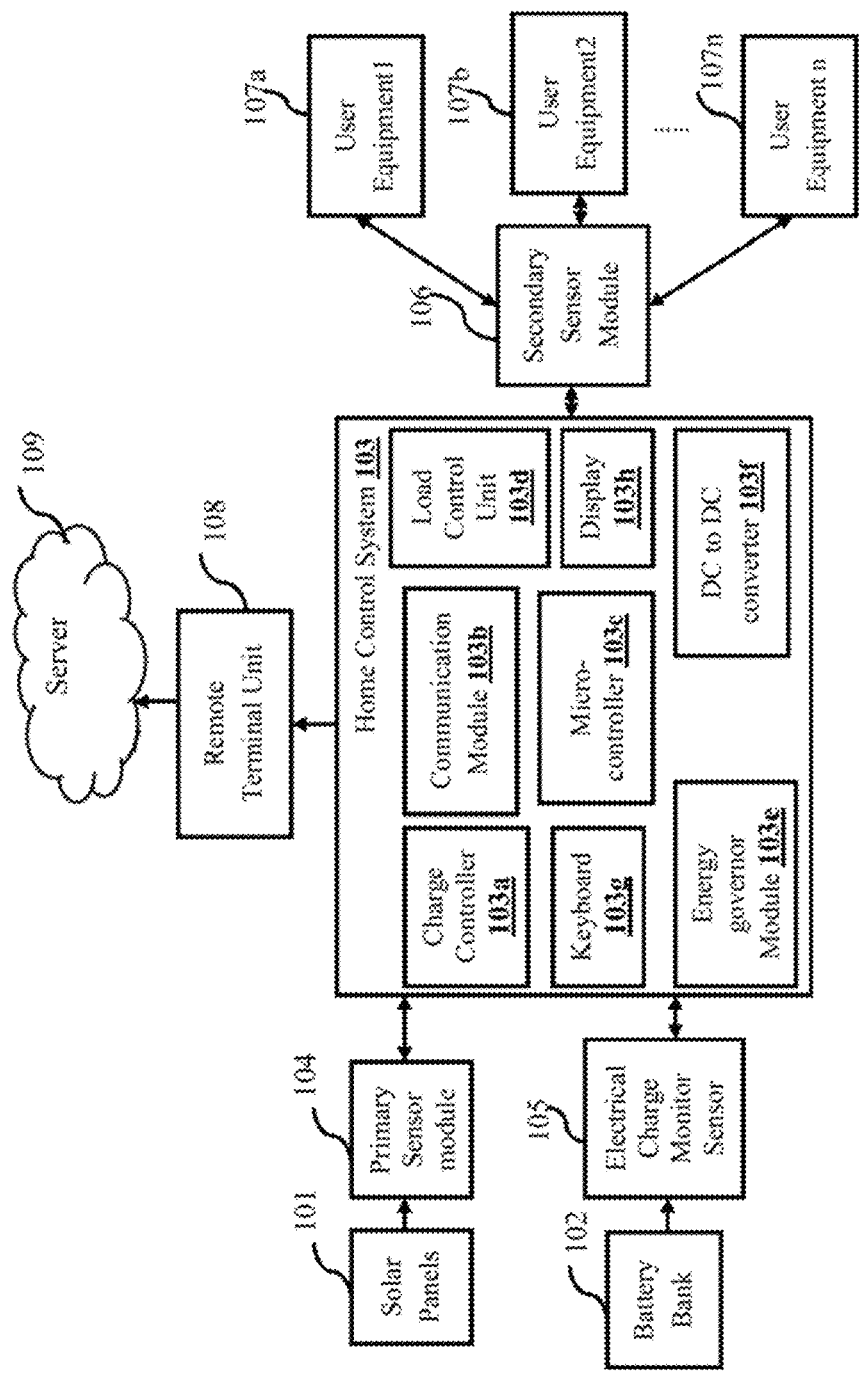
FIG. 1 illustrates a functional block diagram of a solar energy based DC off-grid home system, according to one embodiment herein.

Although the specific features of the embodiments herein are shown in some drawings and not in others, this is done for convenience only as each feature may be combined with any or all of the other features in accordance with the embodiments herein.

DETAILED DESCRIPTION OF THE EMBODIMENTS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide an energy efficient DC off-grid home system and a method for operating the same. The DC off-grid home system is configured for generating, storing and delivering the solar energy to the connected equipments in a controlled and efficient manner. The DC off-grid home system comprises a plurality of solar panels; a battery bank; a home control unit; and a remote terminal unit. The plurality of solar panels is configured to capture solar energy and convert the solar energy to electrical energy. The battery bank comprises a plurality of batteries, which is configured to store the electrical energy received from the solar panels. The home control system is configured to assist the battery bank, in storing the electrical energy. The home control system is further configured to deliver optimum energy to a plurality of electrical appliances, and to monitor a system condition or status. The remote control unit, in communication with the home control unit is configured to monitoring a healthy operating status of a system on a periodic basis, and to upload monitored data to a cloud hosted remote server.

According to one embodiment herein, the plurality of solar panels comprises a set of solar photovoltaic modules electrically connected and mounted on a supporting structure. The photovoltaic module comprises a plurality of solar cells.

According to one embodiment herein, the home control unit comprises a plurality of sub-systems for controlling and monitoring a plurality of processes. The plurality processes ranges from a process for generating electrical energy to a process for delivering the electrical energy to the plurality of electrical appliances.

According to one embodiment herein, the plurality of sub-systems further comprises an intelligent charge controller configured to control a delivery of maximum energy from the plurality of the solar panels to the battery bank, a communication module in communication with a cloud hosted remote server and configured to upload information regarding a healthy operating status of the system to a load control unit, a DC to DC converter configured to control an output voltage of the battery bank based a voltage requirement of the plurality of appliances and an energy governor module.

According to one embodiment herein, the home control unit delivers the electrical power to the end user equipment and constantly monitors the electrical power drawn by the plurality of appliances to change an output voltage on the channel to maximize an efficiency of the off-grid system.

According to one embodiment herein, the energy governor constantly monitors the battery capacity and a consumption pattern to dynamically adjust the energy delivered to the plurality of appliances loads using an intelligent algorithm to maximize the battery life and to increase an operating time of the plurality of appliances.

According to one embodiment herein, the off-grid system directly distributes the electrical energy stored in the battery bank to the plurality of appliances. The plurality of appliances comprises one or more domestic electrical and electronic appliances.

According to one embodiment herein, the system comprises a variable output DC to DC converter. The off-grid system integrates the variable output DC to DC converter with the charge controller unit.

According to one embodiment herein, the output voltage of the DC to DC converter is tuned dynamically corresponding to every sub-unit of a main appliance by an on-board microcontroller to minimize the power consumption.

According to one embodiment herein, the remote terminal unit comprises a communication module for uploading the monitored data to the cloud hosted remote server.

According to one embodiment herein, the communication module adopts wired and wireless communication mechanisms selected from the group comprising Ethernet, Wi-Fi, GSM/GPRS, LTE, WiMax, 3G, power line communication and ZigBee protocols.

According to one embodiment herein, the home control unit delivers the electrical power to the plurality of appliances and constantly monitors the electrical power drawn by the plurality of appliances to change the output voltage on the channel to maximize the efficiency of the DC off-grid home system.

According to one embodiment herein, an on-board microcontroller is configured for tuning the output voltage of the DC to DC converter for minimizing the power consumption. The output voltage of the DC to DC converter is tuned dynamically corresponding to each electrical appliance.

According to one embodiment herein, the off grid system further comprises a primary sensor module installed at strategic locations within the end user premises to gather the power consumption data from the solar panels. The system further comprises a secondary sensor module configured to monitor a plurality of parameters including, but not limited to temperature, light and humidity of the system. The primary sensor module and the secondary sensor module collect the plurality of data for selecting a suitable time for maintenance services. The maintenance services comprise recharging the batteries with distilled water, cleaning the solar panels, and servicing an electrical appliance.

According to one embodiment herein, the system further comprises an electrical charge monitor sensor installed at the battery bank for monitoring the electrical charge level in the plurality of batteries.

According to one embodiment herein, the data from the primary sensor module, the secondary sensor module and the charge monitor sensor are fed to the on-board microcontroller.

According to one embodiment herein, the on-board microcontroller comprises one or more programs for regulating the plurality of sub-systems and modules of the system based on the data received from the primary sensor module, the secondary sensor module and the charge monitor sensor. The on-board microcontroller regulates the energy governor to control a delivery of energy to the plurality of appliances based on the data received from the charge monitor sensor.

According to one embodiment herein, the home control unit further comprises a display for displaying the status of the DC off-grid home system and real time performance data to the end user. The home control unit further comprises a keypad for providing inputs and controlling the display. The display is selected from a group comprising an Organic Light Emitting Diode (OLED) and a Liquid Crystal Display (LCD). The display is configured to alert the end user on the critical events. The critical events include a low battery condition, a solar panel cleaning requirement condition and a maintenance requirement condition.

According to one embodiment herein, the status of the DC off-grid home system comprises information on a currently switched-on appliance, an amount of energy drawn from the appliance, temperature, humidity, battery capacity, a rate of discharge, and an overall energy delivered from the solar panel over time.

The embodiments herein provide a method for generating, storing and delivering solar energy to the plurality of appliances through an off-grid DC solar home system. The method comprises the following steps: A plurality of solar panels is installed for capturing solar energy and converting the solar energy to electrical energy. A battery bank is installed for storing electrical energy. A home control system is installed for assisting in storing the electrical energy in the battery bank, delivering an optimum energy to a plurality of electrical appliances, and monitoring an operating status of the system. The home control unit is connected to the plurality of appliances which run on the generated electric power. A healthy operating status of the system is monitored on a periodic basis. The monitored data is uploaded to a cloud hosted remote server. An output voltage of the battery bank is controlled based on the voltage requirements of the plurality of appliances. The delivery of maximum energy is controlled from the plurality of the solar panels to the battery bank. The energy delivered to the plurality of appliances is adjusted using an intelligent algorithm to maximize the battery life and to increase the operating time of the plurality of appliances.

FIG. 1 illustrates a functional block diagram of a solar energy based DC off-grid home system, according to one embodiment herein. The DC off-grid home system is configured to generate, store and efficiently deliver solar energy to a plurality of equipments. The system is further configured to monitor the energy distribution to the equipments in order to run the equipments for the longest duration on daily basis and to offer a substantial improvement in battery life. The DC off-grid home system comprises a plurality of solar panels 101, a battery bank 102 comprising a plurality of batteries, a home control unit 103, a remote terminal unit (RTU) 108, a primary sensor module 104, an electrical charge monitor sensor 105, a secondary sensor module 106 and a plurality of user equipments 107a to 107n. Further, the home control unit 103 comprises a charge controller 103a, a communication module 103b, a micro-controller 103c, a load delivery unit 103d, an energy governor 103e and DC to DC converter 103f.

According to one embodiment herein, the plurality of solar panels 101 of the system is configured to gather the maximum amount of solar energy from sun. The collected solar energy is used to generate electricity that is used to operate the plurality of end user equipments. The plurality of solar panels 101 comprises a set of solar photovoltaic modules electrically connected and mounted on a supporting structure. The photovoltaic module comprises a plurality of solar cells. The plurality of energy producing solar cells is made of amorphous or crystalline silicon or thin film technology. The electricity generated at the plurality of solar panels 101 is used to charge the battery bank. The electric charge stored in the battery bank is provided as power supply to the plurality of equipments 107a-107n. The battery bank 102 comprising of a number of batteries are connected in series/parallel configuration to provide an adequate energy to power the DC off-grid home system.

According to one embodiment herein, the home control unit 103 is the main part of the DC off grid home control system. The home control unit delivers the electrical power to the end user equipment and constantly monitors the electrical power drawn by the plurality of appliances to change an output voltage on the channel to maximize an efficiency of the off-grid system. The home control unit 103 executes the operations comprising charging the battery bank 102 using the energy from solar panels 101, monitoring the healthy operating status of the system, communicating with a computer program resident on a cloud server 109 of the DC off-grid home system, delivering the most efficient power to the end user equipments 107a-107n such as Fans, TVs, Lights and controlling the running of the end user equipments 107a-107n to save energy. For performing the aforementioned functions, the home control unit 103 is provided with a built-in charge controller 103a that boosts the charge or bucks the charge coming out of the solar panels 101. The charge controller 103a optimally charges the battery bank 102 to attain a highest efficiency.

According to one embodiment herein, the secondary sensor module 106 comprises various sensors to monitor temperature, light and humidity of the plurality of equipments. With respect to FIG. 1, a signal from secondary sensor module 106 is fed to the microcontroller 103c to charge the battery bank 102 efficiently using an algorithm. The microcontroller 103c delivers a power to the end user loads/equipments 107a to 107n efficiently based on the output of the secondary sensor module 106. The output of the secondary sensor module 106 also helps to determine or select a suitable time for maintenance services such as recharging the batteries with distilled water, cleaning the solar panels, servicing an equipment etc. The system also issues an alert notification to a service provider 109 based on the output of the secondary sensors to indicate that the DC off-grid solar home system is in need of a service. The service provider 109 is an entity which handles the distribution, installation and maintenance of the DC off-grid home system. The signals from the secondary sensors are delivered through the communication module 103b. The communication module 105 is used for uploading data gathered from the DC off-grid home system on the server. The communication module 103b is capable of uploading the data using wired or wireless Ethernet, WiFi, GSM/GPRS, LTE, WiMax, 3G, power line communication or ZigBee protocols.

With respect to FIG. 1, the secondary sensor module 106 comprises a current sensor which is configured to monitor the energy drawn by the end user equipment and report the drawn current quantity to the microcontroller 103c. Based on the current quantity drawn by the end user equipment, the microcontroller 103c resident within the home control unit 103 invokes an appropriate algorithm when the energy drawn by the equipment is in excess of a preset amount.

According to one embodiment herein, the energy governor module 103e of the home control unit 103 is used to regulate the overall energy drawn by the end user equipments 107 in-order to conserve the energy stored within the battery bank 102. The load delivery unit 103d is a set of programmable relay switches connected to the programmable DC to DC converter 103f and are regulated by the energy governor 103e to deliver an appropriate energy to each load 107. The energy governor 103e dynamically adjusts the energy delivery to the end user equipment 107 such that the delivery efficiency is maximized and the high energy consumption equipment is shutdown or the high energy consumption equipment is put in a lower energy consumption state, when the battery capacity approaches a critical level. When a particular equipment/load 107a draws a heavy current leading to a drain of the battery charge rapidly, the microcontroller 103c directs the energy governor 103e to turn off the relay switch and alert the end user of a low battery condition. Thus the energy governor 103e increases the life of battery bank 102 by reducing and modulating a depth of discharge as well as extending the duration for which the equipment must be kept ON and running. The energy governor 103e also receives the inputs from the primary sensor module 104 placed within a room of the end user premises and equipments to detect an inactive period of the equipments to shut down those equipments that are not in use/active. The primary sensor module output the detection signals to the microcontroller 103c. The microcontroller 103c controls the energy governor 103e to shut down the equipment or set the equipment in a low energy consumption state to conserve energy by using an algorithm.

With respect to FIG. 1, the microcontroller 103c regulates the various sub-systems/modules within the home control unit 103, using the intelligent algorithms programmed within the microcontroller 103c. The microcontroller 103c gathers a usage data from the primary sensor module 104 which are located at the strategic locations within the end user premises to gather the power consumption data from the solar panels 101. The microcontroller 103c also gathers a battery related data from the electric charge monitor sensor 105 and regulates the energy governor 103e to control a delivery of energy to the equipments 107. The microcontroller 103e also assists in conserving the energy usage as well as maximizing a battery life.

With respect to FIG. 1, the home control unit 103 is provided with a display 103h and a keypad 103g for receiving the inputs and controlling the display. The display 103h is an Organic Light Emitting Diode (OLED) or a Liquid Crystal Display (LCD) display to show the status of the DC off-grid home system and a real time performance data to the end user. The status of the DC off-grid home system comprises but not limited to, a currently turned on equipment, an energy drawn from the equipment, temperature, humidity, battery capacity, a rate of discharge, and an overall energy delivered from the solar panel 101 on a particular day. The display 103h is also provided for alerting the end user of the critical events such as low battery condition, need for cleaning solar panel 101 and any other events that require maintenance. The keypad 103g is used to manipulate the data presented on the display and browsing between the status messages to turn ON or OFF the end user equipments 107.

With respect to FIG. 1, a plurality of energy efficient appliances which is operated on DC power, for example, energy efficient fans, lights, refrigerators, TV and other equipments, is coupled with the DC off-grid home system. The fans use a brushless motor that is operated on Direct Current (DC) and consume a fraction of the energy consumed by the Alternating Current (AC) counterparts and deliver the same output in terms of air flow and rotations per minute as the corresponding AC counter parts. The energy efficient lights are LED lights that produce the same lumens as incandescent or fluorescent or compact fluorescent counterparts at much lower energy consumption. The energy efficient TV is low energy consumption Television (TV) and is a LCD or a Light Emitting Diode (LED) TV specifically designed to draw a very little energy. The energy efficient refrigerator consumes a fraction of the energy consumed by equivalent AC refrigerators by way of efficient motors and fewer moving parts and optimized to work with an on-grid or off-grid solar DC home system. The energy efficient equipment includes and not limited to blenders, laptops & tablet computers, air-conditioners that are all optimized to work on solar power and Direct Current. The DC run equipments consume much lower energy than that of the equivalent AC equipments With respect to FIG. 1, the plurality of energy efficient equipments is connected to the secondary sensor module. The secondary sensor module comprises of a plurality of sensors for monitoring various parameters of the user equipments. The network of secondary sensors are either connected to the end user equipment such as LED lights, fans, TV and the like or they are placed in-common at strategic locations within the end user premises. The network of secondary sensors monitors the energy usage of equipment and presence of a human within a room. On detection of human presence, the secondary sensor module communicates the detection data back to the microcontroller 103c within the home control unit 103. The primary sensor module 104 is placed along the solar panels 101 so as to monitor the intensity of incident light and monitor the energy output of the solar panels 101 for estimating a periodic servicing of the panels such as cleaning the surface of the panels. Similarly, the electrical charge monitor sensor 105 is placed on the battery bank 102 to monitor the output of the pluralities of batteries to forward the service alerts to the home control unit 103 for estimating the periodic servicing of the battery such as topping up off the battery fluids. The detection data from the primary sensor module 104 and electrical charge monitor module 105 is communicated back to the controller 103c using ZigBee, or Bluetooth or Power Line Communications protocols.

With respect to FIG. 1, the remote terminal unit (RTU) 108 of the system, in communication with home control unit 103, is configured to control all the equipments by communicating with the intelligent home control unit 103 and is used as a substitute for the keypad residing on the home control unit 103. The remote terminal unit communicates with the home control unit 103 through an equivalent built-in communication module 105. The remote terminal unit also comprises a communication module for uploading the monitored data to the cloud hosted remote server. The communication module adopts wired and wireless communication mechanisms selected from the group comprising Ethernet, Wi-Fi, GSM/GPRS, LTE, WiMax, 3G, power line communication and ZigBee protocols.

According to one embodiment herein, the DC off-grid home system also integrates the remote terminal unit 108 comprising a GSM/GPRS module or a Wi-Fi module. The remote terminal unit 108 monitors a healthy operating status of a system on a periodic basis and upload the detected and monitored data to a computer server. This data is analyzed periodically by a vendor of the equipment to determine a suitable time for servicing the system such as recharging the batteries with distilled water, cleaning the panels or servicing the equipment.

Figure 2:
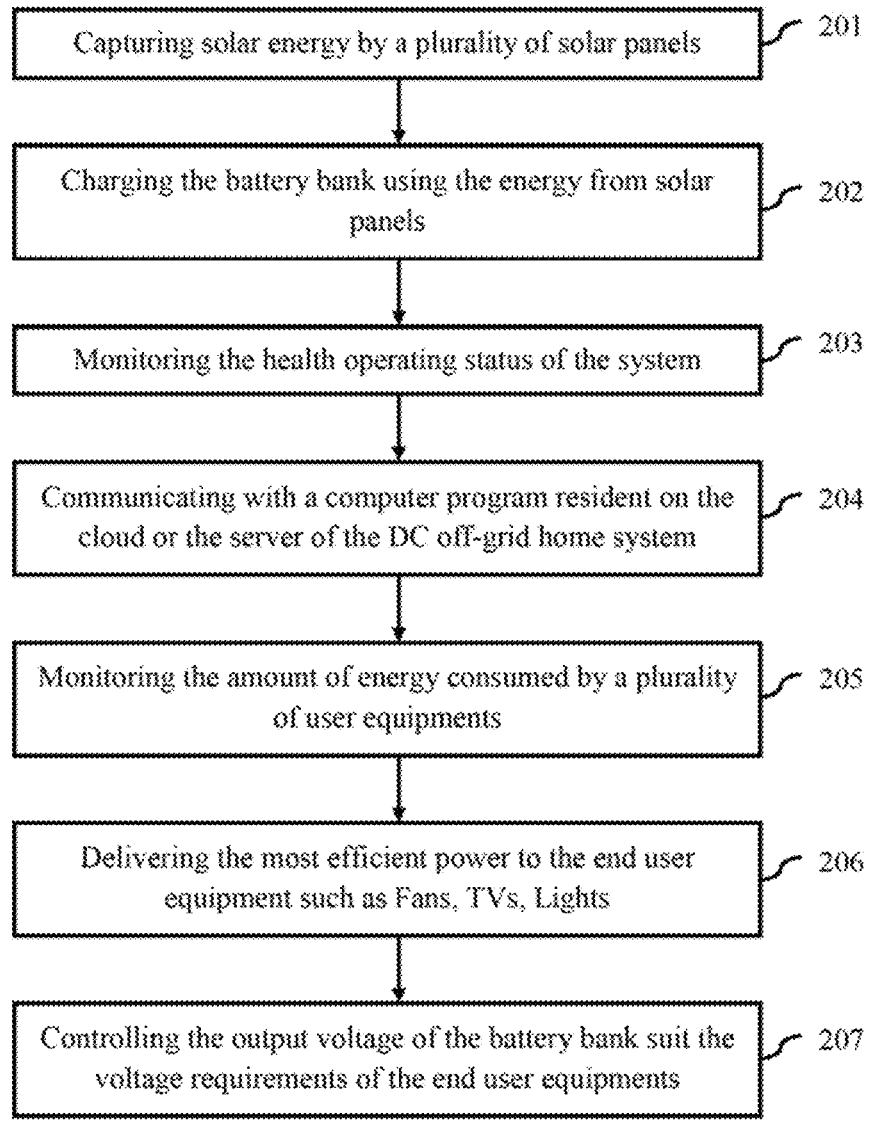
FIG. 2 illustrates a flowchart explaining the plurality of steps in a method for generating, storing and delivering solar energy to the plurality of appliances through an off-grid DC solar home system, according to one embodiment herein.

FIG. 2 illustrates a flow chart explaining the plurality of steps involved in a method for generating, storing and delivering solar energy to the plurality of appliances through an off-grid DC solar home system, according to one embodiment herein. The method comprises following steps: The solar energy from sun is captured by the plurality of solar panels (201). The captured solar energy is converted to electricity by the solar cells of the solar panels. The battery bank is charged by the electricity produced by the plurality of solar panels (202). The health operating status of the system is regularly monitored (203) and the monitored data is uploaded to the cloud server, by the remote control unit. In response to the monitored data, the cloud server communicates a resident computer program to the home control unit of the system (204). The computer program is loaded onto the microcontroller of the home control unit. The program on microcontroller is configured to monitor the amount of energy consumed by a plurality of user equipments (205). Depending on the energy consumption, power from the battery bank is delivered to end user equipments efficiently (206). Further the output voltage of the battery bank is controlled to suit the voltage requirements of the end user equipments (207). When particular user equipment draws a heavy current leading to a drain of the battery charge rapidly, the microcontroller directs the energy governor to turn off the relay switch and alert the end user of a low battery condition.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

Although the embodiments herein are described with various specific embodiments, it will be obvious for a person skilled in the art to practice the embodiments herein with modifications.

It is also to be understood that the following claims are intended to cover all of the generic and specific features of the embodiments described herein and all the statements of the scope of the embodiments which as a matter of language might be said to fall there between.

What is claimed is:

1. An off-grid DC solar home system for generating, storing and delivering solar energy to connected equipments, the system comprises:
    a plurality of solar panels for capturing solar energy and converting solar energy to electrical energy;
    a battery bank comprising a plurality of batteries arranged in series and parallel combinations for storing electrical energy;
    a home control unit for assisting in storing the electrical energy in the battery bank, delivering optimum energy to a plurality of electrical appliances, and monitoring a system condition or status, and wherein the home control unit further comprises a display for displaying a status of the DC off-grid home system, and wherein the status of the DC off-grid home system comprises a currently switched-on appliance, an energy drawn by the appliance, temperature, humidity, battery capacity, a rate of discharge, and an overall energy delivered from the solar panel over time;
    a remote terminal unit for monitoring a healthy operating status of a system on a periodic basis, and wherein the remote terminal unit uploads a monitored data to a cloud hosted remote server; and
    an energy governor configured to constantly monitor the battery capacity and a consumption pattern to dynamically adjust an electrical energy delivered to the plurality of appliances using an intelligent algorithm to maximize the battery life and to increase an operating time of the plurality of appliances.

2. The system according to claim 1, wherein the plurality of solar panels comprises a set of solar photovoltaic modules that are electrically connected and mounted on a supporting structure, and wherein the photovoltaic module comprises a plurality of solar cells.

3. The system according to claim 1, wherein the home control unit comprises a plurality of sub-systems for controlling and monitoring a plurality of processes and wherein the plurality processes ranges from a process for generating electrical energy to a process for delivering the electrical energy to the plurality of electrical appliances.

4. The system according to claim 1, wherein the plurality of sub-systems further comprises:
    an intelligent charge controller for controlling a delivery of maximum energy from the plurality of the solar panels to the battery bank;
    a communication module for communicating with a cloud hosted remote server, and wherein the communication module uploads information regarding a healthy operating status of the system to a load control unit;
    a DC to DC converter for controlling an output voltage of the batter bank based on a voltage requirement of the plurality of appliances and an energy governor module.

5. The system according to claim 1, wherein the home control unit delivers the electrical power to the end user equipment and constantly monitors the electrical power drawn by the plurality of appliances to change an output voltage on the channel to maximize an efficiency of the off-grid system.

6. The system according to claim 1, wherein the off-grid system directly distributes the electrical energy stored in the battery bank to the plurality of appliances, and wherein the plurality of appliances comprises one or more domestic electrical and electronic appliances.

7. The system according to claim 1 further comprises a Variable output DC to DC converter, and wherein the variable output DC to DC converter is integrated with the charge-controller unit.

8. The system according to claim 1, wherein the output voltage of the DC to DC converter is tuned dynamically corresponding to every sub-unit of a main appliance by an on-board microcontroller to minimize the power consumption.

9. The system according to claim 1, wherein the remote terminal unit comprises a communication module for uploading the monitored data to the cloud hosted remote server.

10. The system according to claim 1, wherein the communication module is wired or wireless communication module, and wherein the communication module is selected from a group consisting of a Ethernet, Wifi, GSMIGPRS LTE, WiMax, 30, power line communication and ZigBee protocols.

11. The system according to claim 1, wherein the home control unit delivers the electrical power to the plurality of appliances and constantly monitors the electrical power drawn by the plurality of appliances to change the output voltage on the channel to maximize the efficiency of the DC off grid home system.

12. The system according to claim 1 further comprises an on-board microcontroller for tuning the output voltage of the DC to DC converter for minimizing the power consumption, and wherein the output voltage of the DC to DC converter is tuned dynamically corresponding to every unit of the electrical appliance.

13. The system according to claim 1 further comprises a primary sensor module installed at strategic locations within the end user premises to gather the power consumption data from the solar panels, and a secondary sensor module for monitoring temperature, light and humidity of the system, and wherein the primary sensor module and the secondary sensor module collects a plurality of data for selecting a suitable time for maintenance services, and wherein the maintenance services comprises recharging the batteries with distilled water, cleaning the solar panels, and servicing an electrical appliance.

14. The system according to claim 1 further comprises an electrical charge monitor sensor installed at the battery bank for monitoring a residual electrical charge level in the plurality of batteries.

15. The system according to claim 13, wherein the data from the primary sensor module, the secondary sensor module and the charge monitor sensor are fed to the onboard microcontroller.

16. The system according to claim 13, wherein the on-board microcontroller comprises one or more programs for regulating a plurality of sub-systems and modules of the system based on the data received from the primary sensor module, the secondary sensor module and the charge monitor sensor, and, wherein the on-board microcontroller regulates an energy governor to control a delivery of energy to the plurality of appliances based on the data received, from the charge monitor sensor.

17. The system according to claim 1, wherein the home control unit further comprises a keypad for providing inputs and controlling the display, and wherein the display is selected from a group comprising an Organic Light Emitting Diode (OLED) and a Liquid Crystal Display (LC)) and wherein the display alerts the end user on the critical events, and wherein the critical events includes a low battery condition, a solar panel cleaning requirement and a maintenance process.

18. A Method for generating, storing and delivering solar energy to the plurality of appliances through an off-grid DC solar home system, the method comprises the steps of:
    installing a plurality of solar panels for capturing solar energy and converting solar energy to electrical energy;
    installing a battery bank for storing the electrical energy;
    installing a plurality of solar panels for capturing solar energy and converting solar energy to electrical energy;
    installing a home control unit for assisting in storing the electrical energy in the battery bank, delivering an optimum energy to a plurality of electrical appliances, and monitoring the system operating status;
    connecting the home control unit to the plurality of appliances which run on electric power;
    monitoring a healthy operating status of a system on a periodic basis;
    uploading monitored data to a cloud hosted remote server;
    controlling an output voltage of the battery bank to suit a voltage requirement of the plurality of appliances;
    controlling delivery of maximum energy from the plurality of the solar panels to the battery bank; and
    adjusting electrical energy delivered to the plurality of appliances using an intelligent algorithm to maximize the battery life and to increase is the operating time of the plurality of appliances.

* * * * *